June 18, 1940.  C. C. FARMER  2,204,796
RETAINING VALVE DEVICE
Filed March 23, 1939  2 Sheets-Sheet 1
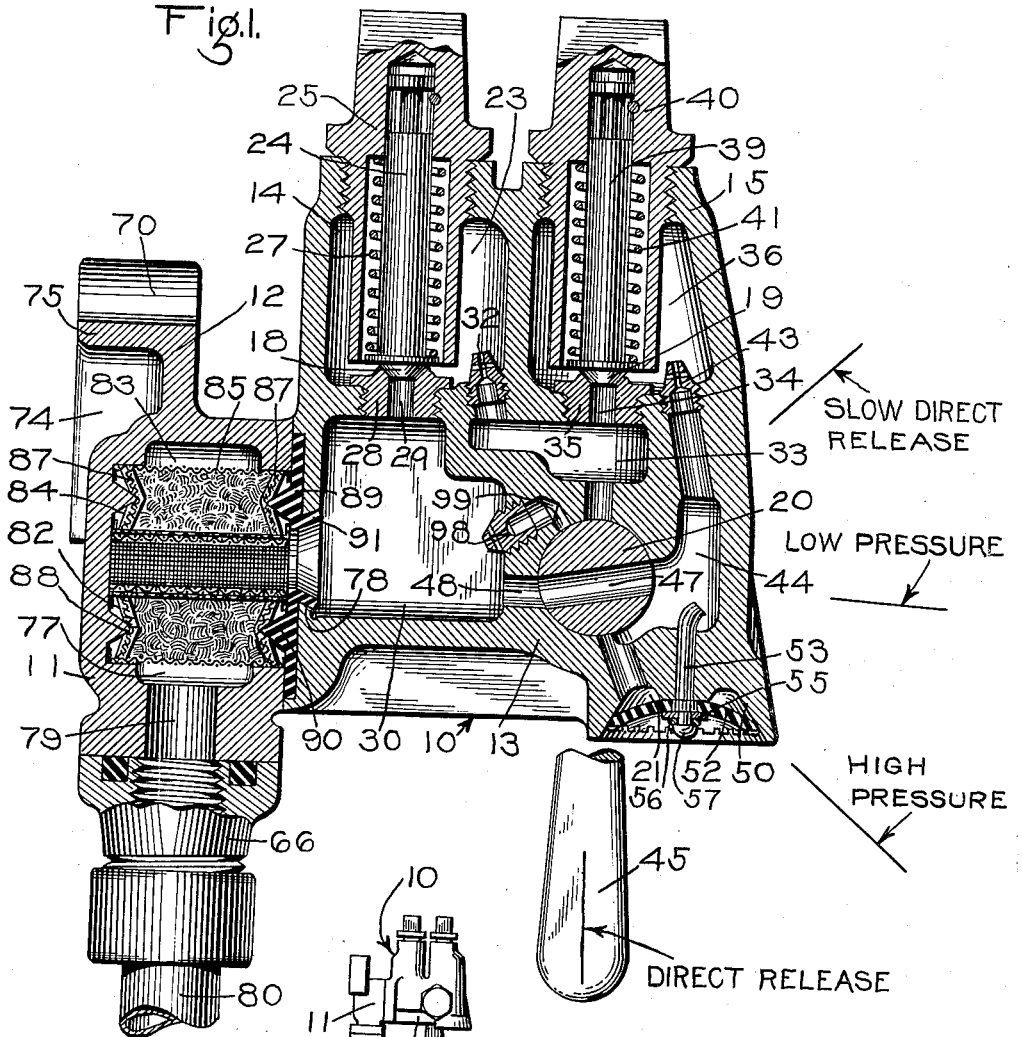
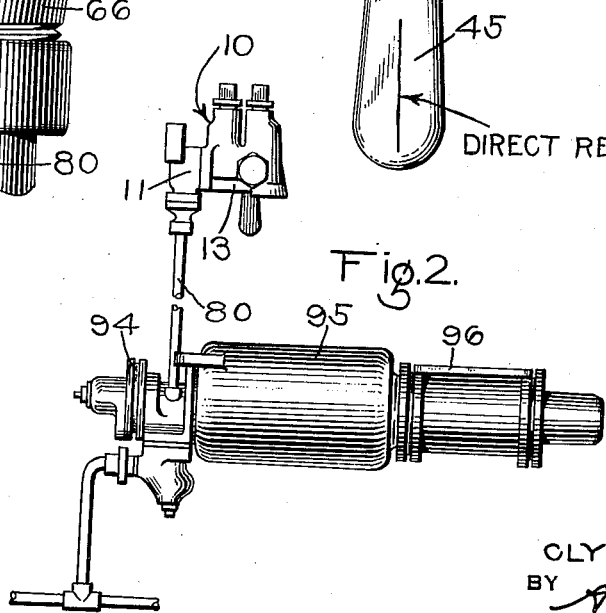
INVENTOR
CLYDE C. FARMER
BY
ATTORNEY June 18, 1940.  C. C. FARMER  2,204,796
RETAINING VALVE DEVICE
Filed March 23, 1939  2 Sheets-Sheet 2
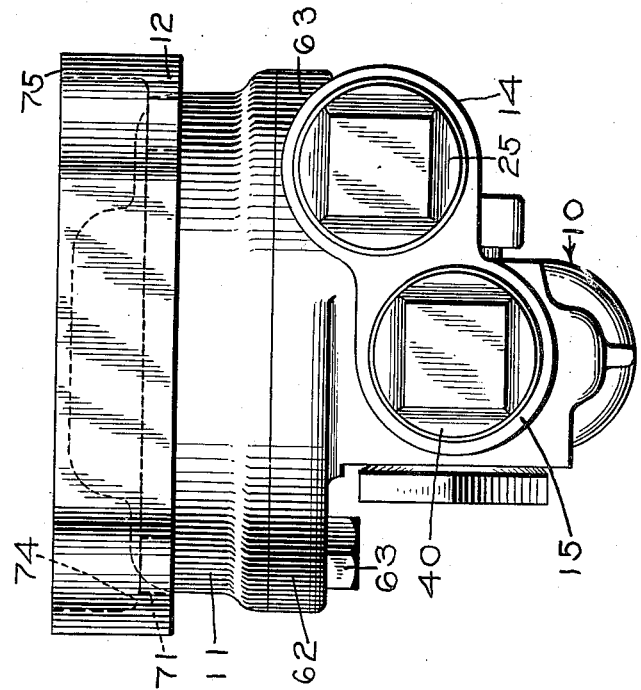
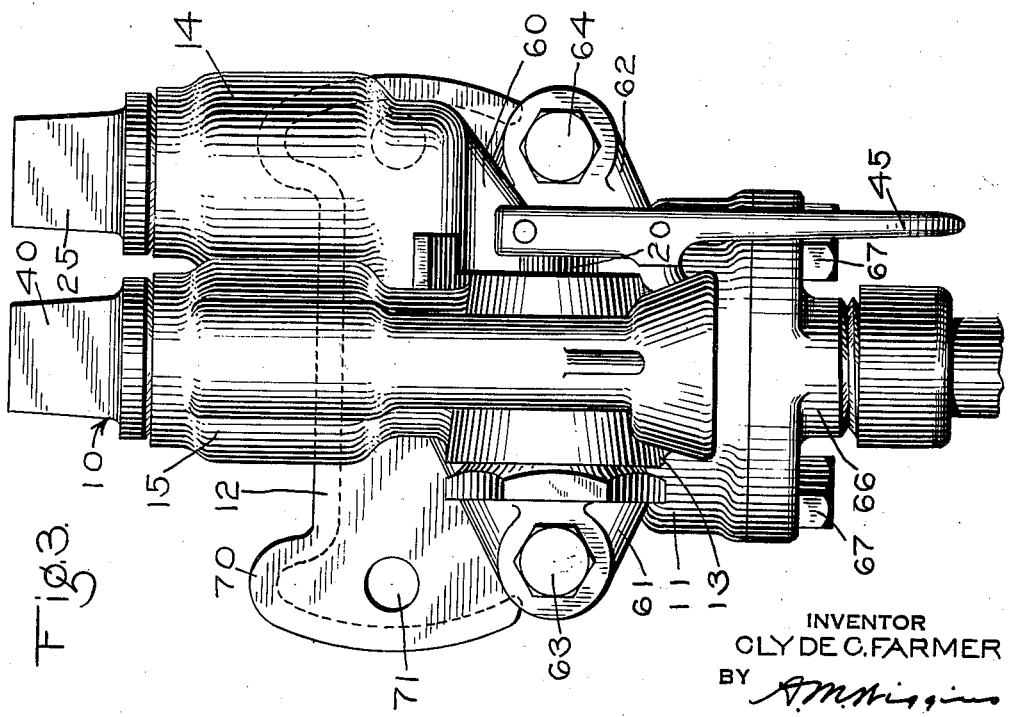
INVENTOR
CLYDE C. FARMER
BY
ATTORNEY

Patented June 18, 1940

2,204,796

UNITED STATES PATENT OFFICE 2,204,796

RETAINING VALVE DEVICE

Clyde C. Farmer, Pittsburgh, Pa., assignor to The Westinghouse Air Brake Company, Wilmerding, Pa., a corporation of Pennsylvania Application March 23, 1939, Serial No. 263,587

5 Claims. (Cl. 303—79)

This invention relates to a retaining valve device of the type adapted to be employed in a fluid pressure brake system for retaining fluid pressure in the brake cylinder.

In order to insure safe control of trains operating on long grades where one or more applications of the brakes may be required, manually adjustable retaining valve devices of various types have long been employed on railway cars to check release of air from the brake cylinders, thereby maintaining the brakes applied with limited force while the brake pipe and associated apparatus of the air brake system are being recharged in preparation for a subsequent application of the brakes. The retaining valve device may comprise a pair of spring weighted check valves and a rotary plug or key valve operable, according to the positioning of a handle, to divert the flow of air discharged from the brake cylinder past one or both of the check valves to the atmosphere, or through an unrestricted passage.

Such a retaining valve device may be provided with a plurality of relatively small discharge openings, which may become clogged with ice or with dislodged particles of the dirt and scale that often accumulate on the greased plug valve heretofore interposed in the inlet passage. In addition, dirt particles from the brake cylinder or the plug valve are sometimes deposited by the discharge flow of air on the check valve mechanisms and may interfere with the normal operation thereof. Further, since this type of retaining valve device is not adapted to be readily removed from the car body, being generally riveted or otherwise permanently secured in place, necessary cleaning and repairing thereof must usually be made in the yard under adverse conditions. It is extremely desirable therefore that a retaining valve device be developed which will properly operate over long periods of time without periodic repair and cleaning.

One object of my invention is to provide an improved retaining valve device comprising air strainer means adapted to clean the air under pressure vented from the brake cylinder before it reaches the usual check valves, and a rotary plug valve controlling the flow path of the brake cylinder air but disposed adjacent a single discharge outlet and beyond the communications leading past the check valves.

Another object of the invention is to provide a retaining valve device comprising a pipe bracket to which a test gauge may be applied, and a body portion adapted to be removably secured to the pipe bracket and having mounted therein a rotary plug valve controlling communication from the usual check valves to a single relatively large discharge opening, within which is disposed a wasp or dirt excluder.

It is a further object of my invention to provide an improved retaining valve device embodying the above features and having a single discharge orifice and a rotatable valve mounted adjacent thereto and movable to direct exhaust, high pressure, low pressure, and slow direct exhaust positions, in the latter of which positions air from the brake cylinder is initially discharged at a fast rate until the pressure thereof is reduced to a predetermined valve, and then at a slow rote for completely venting the brake cylinder.

Other objects and advantages of the invention will appear in the following detailed description thereof, taken in connection with the accompanying drawings, in which Fig. 1 is a diagrammatic sectional view of a retaining valve device constructed in accordance with the invention;

Fig. 2 is a diagrammatic view illustrating the retaining valve device in association with an air brake equipment;

Fig. 3 is an elevational exterior view of my improved retaining valve device, illustrating a preferred structural arrangement of the parts; and Fig. 4 is a top plan view of the device in the form shown in Fig. 3.

Referring to the drawings and particularly to Fig. 1 thereof, the retaining valve device, indicated generally by the character 10, may comprise a pipe bracket 11 having a mounting flange portion 12, and a body casing 13 secured to the pipe bracket and including vertically disposed valve portions 14 and 15.

Mounted within the body casing 13 are a normally seated check valve 18, a similar check valve 19, and a controlling plug or key valve 20, which is disposed adjacent a discharge orifice 21 formed in the casing. The check valve 18 is disposed in a valve chamber 23 formed in the valve portion 14, and has a stem 24 slidably mounted in a bore formed in a cap sleeve member 25 which is screwed into a suitable bore in the valve portion. A coil spring 27 is interposed between the member 25 and a collar formed on the check valve 18 for urging the latter into seating engagement with a seat element 28 secured to the body casing and having a passage 29 communicating with an inlet chamber 30 formed in the casing.

The valve chamber 23 communicates by way of a restricted passage 32 formed in a choke plug with a chamber 33 formed in the body casing. The check valve 19 is adapted to control communication from the chamber 33 by way of a passage 34, formed in a valve seat element 35, with a valve chamber 36, which is formed in a valve portion 15 of the body casing. The check valve 19 is provided with a stem 39 that is slidably mounted within a bore formed in a cap sleeve member 40 having screw threaded connection with the valve portion of the casing, and is normally urged into seated position under the force of a coil spring 41 fitted about the stem. The valve chamber 36 communicates by way of a restricted passage 43 formed in a choke plug with an outlet chamber 44 formed in the body casing, which chamber in turn communicates through the outlet orifice 21 with the atmosphere.

The plug valve 20, which is of the usual rotary type and is fitted in a suitable bore formed in the body casing 13 below the valve portion 15, is adapted to be positioned in the several operating positions as hereinafter described through the medium of an operating handle 45. Formed in the plug valve 20 is a waterway or passage 47 which, with the plug valve disposed in direct release position as shown in Fig. 1, is adapted to connect a passage 48 communicating with the inlet chamber 30 with the discharge chamber 44.

It will be noted that the downwardly facing discharge orifice 21 is formed in the lowermost portion of the body casing 13, and is surrounded by an annular wall having a substantially conical inner surface 50. Disposed within the discharge orifice 21 is a dished circular shield 52, which is preferably formed of a resilient material such as rubber, and is held in place by suitable means such as a centrally disposed rivet 53 extending through a bore into the chamber 44, where the upper end may be bent at a locking angle. The rubber shield 52 is preferably secured to the rivet 53 by means of a washer 55 which is locked in place by a snap ring 56 fitted to the rivet adjacent a terminal head portion 57. The circumferential surface of the shield 52 is adapted to engage the conical surface 50 for preventing access to the discharge orifice 21 of particles of foreign matter or by nest building insects such as the mud warp. A plurality of notches or crenatures are formed in the outer edge of the shield 52 for preventing a sealing engagement thereof with the inner surface of the discharge orifice. It will be noted that the surface 50 of the casing 13 extends somewhat beyond the rubber shield 52 so as to provide an adequate protection against the formation of ice over the exhaust discharge orifice, and that the shield has sufficient area and flexibility to insure its displacement under the pressure of air released from the brake cylinders to eject any foreign matter that might reach it.

In actual practice, the improved retaining valve device 10 is preferably constructed and arranged as shown in Figs. 3 and 4 of the drawings, from which it will be observed that the respective valve portions 14 and 15 of the body casing 13 are disposed in staggered relationship with respect to the pipe bracket 11, the portion 15 extending outwardly of the valve portion 14.

The rotary plug valve 20 is mounted in the portion of the body casing 13 beneath the valve portion 15, and has the handle 45 secured to the end thereof extending into a recess 60 provided below the valve portion 14. It will thus be seen that, although the handle 45 is so spaced from other portions of the retaining valve device as to insure adequate room for operation thereof, the outermost portion of the device will not project too far from the car body.

The body casing 13 has formed thereon a pair of clamping flange portions 61 and 62, which are suitably apertured to receive clamping bolts 63 and 64 that are provided for securing the body casing to the pipe bracket 11. Each of the clamping flange portions is suitably spaced from other portions of the body casing 13 to permit application of a wrench to the respective bolts.

As shown in Figs. 3 and 4, the pipe bracket 11 has formed thereon a suitable mounting portion to which a flanged pipe union assembly 66 is adapted to be secured by means of suitable bolts 67. The flange portion 12 of the pipe bracket 11 has formed thereon vertically projecting ears such as that indicated at 70 in Fig. 1, for preventing rocking or loosening of the retaining valve device when secured in place on a vehicle. Suitable apertures 71 are formed in opposite ends of the flange portion 12 for receiving rivets or other means for securing the flange portion to the vehicle body. As is best shown in Fig. 4, the flange portion 12 is hollow, being provided with a recess 74 which is open at the bottom to prevent accumulation therein of cinders or rust forming matter. With this construction, contact between the flange portion 12 of the bracket 11 and the vehicle body to which it is secured is limited to the curved lip portion 75 surrounding the recess 74, so that development of rust due to retention of moisture and the like is avoided.

Referring again to Fig. 1 of the drawings, the pipe bracket 11 has formed therein an inlet chamber 77 which communicates by way of an opening 78 formed in the body casing 13 with the inlet chamber 30, and through a passage 79 and the bore within the pipe union assembly 66 with the usual brake cylinder discharge pipe 80. Disposed horizontally within the inlet chamber 77 is a strainer unit 82, which may be of any suitable type and preferably comprises outer and inner cylindrical members 83 and 84 made of wire mesh or similar material and having packed therebetween a quantity of straining material 85. The ends of the air strainer unit 82 are covered by felt washer elements 87, one of which is adapted to be engaged by an annular rib 88 formed on the wall of the chamber 77. A resilient gasket 90 is interposed between the body casing 13 and the pipe bracket 11 and has formed thereon an annular bead or rib 90 adapted to be pressed against the felt washer 87 at the end of the strainer unit opposite the rib 88. The gasket 89 also has formed thereon a flaring annular lip portion 91 adapted to grip the casing surface within the opening 78 for positioning the gasket while the retaining valve device is being assembled.

As shown in Fig. 2 of the drawings, it will be seen that the retaining valve device 10 is adapted to be associated with a fluid pressure brake equipment comprising a triple valve device 94, auxiliary reservoir 95 and a brake cylinder 96, it being understood that the triple valve device 94 is operative in the usual manner in effecting release of the brakes to vent air under pressure from the brake cylinder 96 by way of the discharge pipe 80 and the retaining valve device.

Air under pressure thus vented from the brake cylinder flows by way of the pipe 80 and passage 79 in the pipe bracket 11 to the inlet chamber 77 where the strainer unit 82 effects removal of dirt and scale which may have been carried with the compressed air, while flow of the air is continued to the chamber 30. Assuming that the handle 45 is disposed in the high pressure position as shown in Fig. 1, the flow of compressed air is continued from the chamber 30 past the valve 18, through restricted passage 32 and chamber 33, past the valve 19, and thence to the atmosphere by way of the chamber 36, restricted passage 43, chamber 44 and discharge orifice 21. It will be apparent that, when the pressure of the air thus discharged from the brake cylinder is reduced to a value determined by the combined force exerted by the springs 27 and 41 on the respective valves 18 and 19, the valves are returned to their seated positions so that the desired pressure is retained in the brake cylinder.

If the handle 45 is disposed in the low pressure position, the passage 47 in the plug valve 20 is adapted to establish a by-pass communication from the chamber 33 to the discharge chamber 44 and orifice 21, so that only the valve 18 is then effective to determine the pressure of air retained in the brake cylinder, which pressure will of course be lower than that retained by the device in its high pressure position as just explained.

If it is desired to effect a quick reduction in the pressure of air in the brake cylinder to a predetermined value followed by complete venting of air therefrom at a slow rate, as for example in controlling application of the brakes of a train operating on undulating track having both descending grade sections and level or reverse grade sections, when retained brake cylinder pressure may ultimately cause objectionable resistance to train movement, the handle 45 of the retaining valve device may be disposed in slow direct release position as indicated in Fig. 1. Air under pressure released from the brake cylinder is thereby directed through the communications established in the high pressure position of the retaining valve device as already explained, the valves 18 and 19 being operative in the usual manner to cut off this communication upon reduction in brake cylinder pressure to the high pressure valve. At the same time, however, with the plug valve 20 positioned in slow direct release position air under pressure flows from the inlet chamber 30 through a restricted passage 98 formed in a choke plug, a port 99, and the valve key passage 47 to the discharge chamber 44 and orifice 21, so that flow of air under pressure from the brake cylinder to the atmosphere is continued at a slow rate, as determined by the restricted passage 98, until the brake cylinder is completely vented.

It should be observed that, regardless of which of the four positions in which the handle 45 is placed, air under pressure discharged from the brake cylinder is first conducted through the strainer unit 82 for depositing any foreign matter carried therewith, and is then caused to flow through communications, which may be controlled by one or both of the valves 18 and 19, before coming into contact with the rotary plug valve 20 disposed adjacent the discharge orifice 21, so that dirt or grease which might otherwise be carried either from the brake cylinder or from the plug valve 20 cannot be deposited in the retaining valves or the associated choke communications.

When it is desired to remove the body casing 13 of the retaining valve device from the pipe bracket 11 for cleaning or repairs, a test for brake cylinder leakage may at the same time be made by securing to the mounting face of the pipe bracket 11 a suitable flange connection associated with a pressure gauge, not shown in the drawings, and then carrying out the various steps of the test in the usual manner.

While one illustrative embodiment of the invention has been described in detail, it is not my intention to limit its scope to that embodiment or otherwise than the terms of the appended claims.

Having now described my invention, what I claim as new and desire to secure by Letters Patent is:

1. A brake cylinder pressure retaining valve device comprising a pipe bracket having a fluid inlet chamber and an annular rib formed on an interior wall thereof, a body casing having a flange portion adapted to be secured to said pipe bracket, retaining valve means mounted in said casing and selectively operable for controlling the venting of fluid under pressure from said inlet chamber to the atmosphere, a sealing gasket clamped between the flange portion of the body casing and said pipe bracket and having an annular bead adapted to project into said inlet chamber, and a fluid filtering element interposed between said bead and the rib on said pipe bracket within the path of fluid under pressure flowing toward said retaining valve means.

2. A brake cylinder pressure retaining valve device comprising a body portion including selectively operable retaining valve means and having a mounting flange surrounding an inlet opening thereof, a pipe bracket adapted to carry said body portion and having an annular rib formed on an interior wall thereof, an apertured sealing gasket interposed between said flange and said bracket and having a projecting annular rib and a concentrically disposed flexible lip portion adapted to grip said flange, a cylindrical fluid filtering element adapted to be interposed between said ribs on the bracket and gasket within the path of fluid flowing toward said retaining valve means within the body portion, and means for removably securing said mounting flange of the body portion to said pipe bracket.

3. A brake cylinder pressure retaining valve device comprising a casing having an inlet passage and a discharge orifice, a pair of retaining valve assemblies mounted in said casing and adapted at times to control communication from said inlet passage to said discharge orifice, and a rotary key valve mounted in the casing adjacent said discharge orifice and movable to a plurality of positions for selectively establishing communication leading from said inlet passage to said discharge orifice by way of one or both valve assemblies or by-passing said valve assemblies, flow of fluid under pressure being always directed through the selected communication prior to passage through said key valve to the discharge orifice regardless of the position of said key valve.

4. A brake cylinder pressure retaining valve device comprising, in combination, a bracket member having an inlet chamber, a body casing secured to said bracket member and including two adjacent valve portions disposed vertically and in staggered relationship with respect to the bracket member, the outer valve portion constituting one wall of a recess formed beneath the inner valve portion, high and low pressure valve assemblies mounted in said valve portions, respectively, a discharge orifice formed in said body casing, a rotary plug valve mounted in said body casing adjacent said orifice and adapted to be positioned to cut one or both said valve assemblies out of communications through which fluid under pressure flows from said inlet chamber to said discharge orifice, and an operating handle secured to said plug valve and disposed within said recess, whereby adequate clearance space for operation of the handle is provided without excessive projection of any portion of the body from the bracket member.

5. A pressure retaining valve device comprising, in combination, a casing having a fluid inlet chamber and a fluid outlet chamber, two pressure controlling valves, a flow restricting device and a manually operated plug valve operable to each of a plurality of positions, said casing and plug valve being so constructed and arranged that said plug valve is operative to connect said inlet and outlet chambers through either a first, direct and unrestricted communication, or a second communication including said two pressure controlling valves in series, or a third communication including only one of said pressure controlling valves, or a fourth communication including only said flow restricting device, the parts being so arranged that in each of said third and fourth communications fluid flowing from the inlet chamber passes through the pressure controlling valve, or through the flow restricting device, before said fluid passes through the plug valve.

CLYDE C. FARMER.